United States Patent [19]

Ward, Jr.

[11] 4,057,323
[45] Nov. 8, 1977

[54] PROJECTION SCREEN

[76] Inventor: Robertson Ward, Jr., 21 W. Elm St., Chicago, Ill. 60610

[21] Appl. No.: 727,255

[22] Filed: Sept. 27, 1976

Related U.S. Application Data

[62] Division of Ser. No. 502,157, Aug. 30, 1974, Pat. No. 3,992,841.

[51] Int. Cl.² ............................................. G03B 21/56
[52] U.S. Cl. ...................................... 350/125; 156/258
[58] Field of Search ................. 156/258; 350/117, 125, 350/294

[56] References Cited

U.S. PATENT DOCUMENTS

| 3,237,517 | 3/1966 | Komitor | 350/125 |
| 3,295,910 | 1/1967 | Hourdiaux | 350/125 |
| 3,449,186 | 6/1969 | Ranö | 156/258 X |
| 3,686,061 | 8/1972 | Brown et al. | 156/258 X |

FOREIGN PATENT DOCUMENTS

| 717,004 | 10/1954 | United Kingdom | 156/258 |

Primary Examiner—Richard A. Wintercorn
Attorney, Agent, or Firm—Norman Lettvin

[57] ABSTRACT

Large projection screens, of which planetarium domes are typical, may conveniently be made up of a plural of prefinished panels, at least one edge of at least some of which panels overlaps another panel in a lap joint construction so that edges of the panels have a minimal effect upon light directed upon the screen from any angle. Panel edges overlapping another panel are tapered from a generally uniform thickness to substantially reduced thickness at the edge in a relatively short distance compared to panel dimensions and made to conform to and lay against the other panel. The panels are preferably made by a method which may involve either first shaping or finishing the projection surface of the dome panel. Each edge which will overlap another panel is then chamfered on the surface opposite the finished surface to form the taper. Finally the chamfered edge is deformed so that it will lay against and conform to the panel which it overlaps.

4 Claims, 22 Drawing Figures

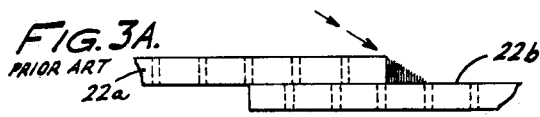
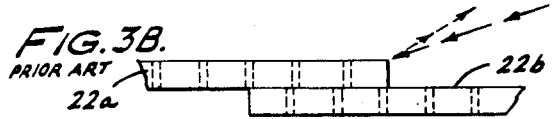
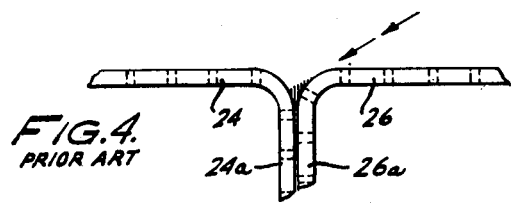
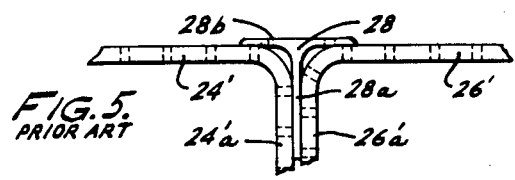
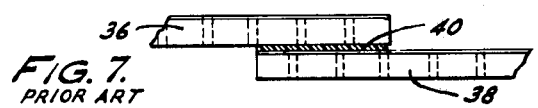
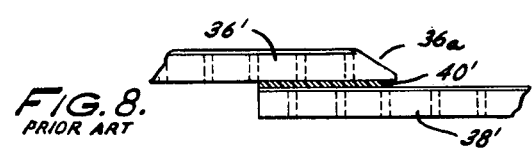
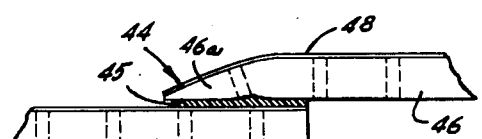
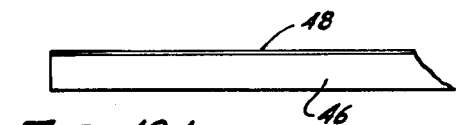
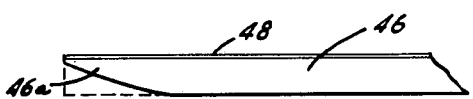
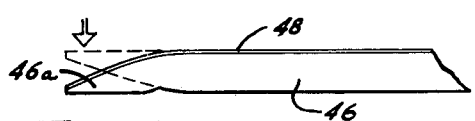
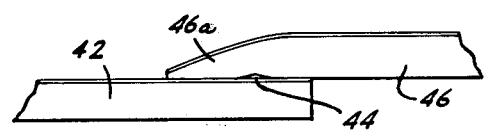
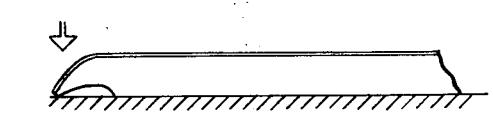
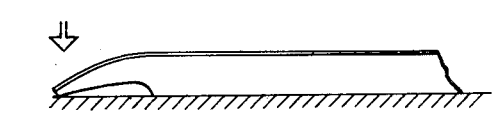

PROJECTION SCREEN

This is a division of application Ser. No. 502,157, filed Aug. 30, 1974, now U.S. Pat. No. 3,992,841, issued Nov. 23, 1976.

The present invention relates to a projection screen, which includes planetarium domes, comprising in part of plurality of panels, at least some of which overlap other panels in a novel lap joint construction. The present invention also concerns panels for such a screen and a method whereby such panels may be formed of prefinished panels without damaging the finish.

Projection screen domes have grown increasingly to greater size and some such as planetarium domes are of complex form. Such screens are composed of a great many panels which may involve many joints. In planetarium domes sheet metal panels are perforated, preformed and shaped to fit together to form a dome which may be self-supporting or more usually supported on a suitable outside frame. The exact nature of the support or frame for the projection screen employed is not of material importance in connection with the present invention which is concerned with the appearance of the projection surface. Because such a screen has to be formed of a plurality of panels, the joints between the panels are clearly visible unless disguised in some way.

A planetarium dome will be considered in particular, since it offers some severe problems related to the invention and it has been subject to considerable activity. If the joints are relatively tight so that the dome screen gives the appearance of being essentially continuous, it is usually quite satisfactory for a night-time simulation in which the stars and planets are projected on the interior surface of the dome. However, when the planetarium lights are turned up the joints become noticeable and in situations where the dome is used for other types of projection, some involving intensive illumination, the joints become a serious problem, casting shadows or reflecting unevenly the light that is projected upon them. Consequently, in the past various attempts have been made to conceal the joints which ordinarily have been either flanged butt joints or lap joints.

Butt joints have been considered by some to be better in appearance, and less obvious, than lap joints but are subject to much more severe tolerance problems in constructing a screen. Nevertheless, they have been often used and attempts have been made to better conceal them. One attempt to conceal butt joints between screen panels in planetariums was the use of a metal strip perforated like the dome panels to overlay the joint. Several means of holding such a strip in position have been suggested. For example, U.S. Pat. No. 3,594,964 suggested a strip T-shaped in cross-section wherein the cross piece was perforated and the vertical tang clamped between the panel flanges. The problem of putting a strip in place and holding it there has been severe and have made the construction of a dome screen much too complicated. Moreover, holes in the strips usually did not coincide with holes in the panel beneath so that such strips have presented areas of greater whiteness than the rest of the dome panels because of the painted surfaces behind the holes in the strips were seen through the holes in the strips. Furthermore, the edges of the strips themselves have provided discontinuities which produce shadows on one side and highlights on the other with light that is not directed perpendicularly to the dome surface.

An improvement over the perforated metal strips was the use of vinyl or other suitable tape of the color of the dome printed with black dots in a similar pattern of distribution as the holes in the panels which were covered. Such strips were more easily applied but often did not adhere well to the dome panels and in use had different reflective properties from the panels themselves despite good matches in color and dot pattern. Such strips have been limited in general to use with screens employing butt joints. Of course, non-perforated screens may have their panel joints taped with plain tape to the same effect.

Lap joints are generally considered easier to assemble because they offer fewer tolerance problems, but their joints have frequently been considered more obvious and less attractive than butt joints, in addition to a step discontinuity at the edge of a lap joint in prefinished panels, the white of the panel beneath shown through perforations of the overlapping panel and produced a whiter stripe than the rest of the screen. An improvement in lap joints was insertion of a strip of black material beneath the overlapping edge of the lap joint so that the panel underneath could not be seen through the holes of the overlapping portion. It is possible to use black strips of this type under a perforated metal strip cover in butt joints as well. However, there are twice as many edges to contend with as in a lap joint construction.

Any edge producing a step or sharp discontinuity in screen surface produces shadows or highlights, depending on the direction of light incident on the particular area of the dome. Certain modern theatrical techniques used in planetariums have made any visibility of sheet edges increasingly objectionable and projection screen techniques in general are becoming more demanding. In an effort to meet such demands, overlapping edges of screen panels have been tapered by cutting away material from the front surface of the panel. However, such procedures have been unsatisfactory where prefinished panels are employed since the edges have had to be repainted. Often such repainting must be done by hand, frequently after the screen is installed. In almost all cases where the screen has been prefinished, matching of the color and reflectance of the original finish is impossible.

The present invention is directed to a prefinished panel for a projection screen having tapered edges at those edges which are intended to overlap other panels. The tapering is preferably done by chamfering the back opposite the finish screen surface after a finished coating has been applied to the inside or screen surface. This is of particular importance today where special continuous coatings, such as vinyl coatings, are often applied as panel material, such as sheet metal, is manufactured and even before being cut into panels. After chamfering, the chamfered edge is deformed until it will lay against and conform to the panel which it overlaps, whereby the substantially reduced thickness will hardly be visible and will not be objectionable. In planetarium domes and other screens using perforated surfaces the present invention may be used in combination with a black strip backing to prevent the overlapped panel from being seen through holes in the panel.

More specifically the present invention concerns a prefinished panel construction for a projection screen employing lap joints between adjacent panels. The panels have a continuous uniform finish suitable for projection over the entirety of one of the faces and are of generally uniform thickness and such size as to overlap at least one adjacent panel. The taper is provided along at least one edge intended to overlap an adjacent panel whereby panel thickness at an adjacent edge is substantially reduced in the taper from the said uniform thickness to the edge in a relatively short thickness. When the tapered edge is formed so that it will conform to and lay against the panel it is intended to overlap.

The projection screen is comprised in part of a plurality of such panels, some of which have edges which overlap other panels in a lap-joint construction which is described. The projection screen may be a hollow dome for a planetarium. The present invention also relates to a method of making a panel for a projection screen from a sheet of material having a pre-finished projection screen surface. In this method each edge of a panel intended to overlap an adjacent panel is chamfered on the surface opposite the prefinished surface to form a tapered edge. Then, the tapered edge is deformed so that it will lay against and conform to the panel which it overlaps whereby a substantially reduced edge thickness will hardly be visible.

For better understanding of the present invention reference is made to the drawings in which:

FIG. 3A is a fragmentary cross-sectional detail view of prior art lap joint diagrammatically illustrating the effect of incident light coming from the upper left;

FIG. 3B is the same structure shown in FIG. 3A wherein incident light is diagrammatically shown as coming from the upper right;

FIG. 4 is a similar diagrammatic showing of a flanged butt joint in which incident light comes from the upper right;

FIG. 5 is a fragmentary cross-sectional view of one type of construction intended to hide a butt joint;

FIG. 6 is a similar fragmentary cross-sectional view showing a taped butt joint in accordance with the prior art;

FIG. 7 is a fragmentary cross-sectional view showing a means intended to hide a lap joint;

FIG. 8 is a view similar to FIG. 7 showing a tapered lap joint applied to prefinished panels in accordance with the prior art;

FIG. 9 is a view similar to FIGS. 7 and 8 showing the tapered lap joint in accordance with the present invention;

FIGS. 10A through 10D are schematic drawings showing steps of a method of forming a joint in accordance with the present invention;

FIGS. 11A through 14A show several different forms which edge chamfering may take in accordance with the present invention; and FIGS. 11B to 14B show shapes which a deformed edge may take using the different types of chamfering shown in the corresponding numbered drawing FIGS. 11A through 14A.

Figure 1:
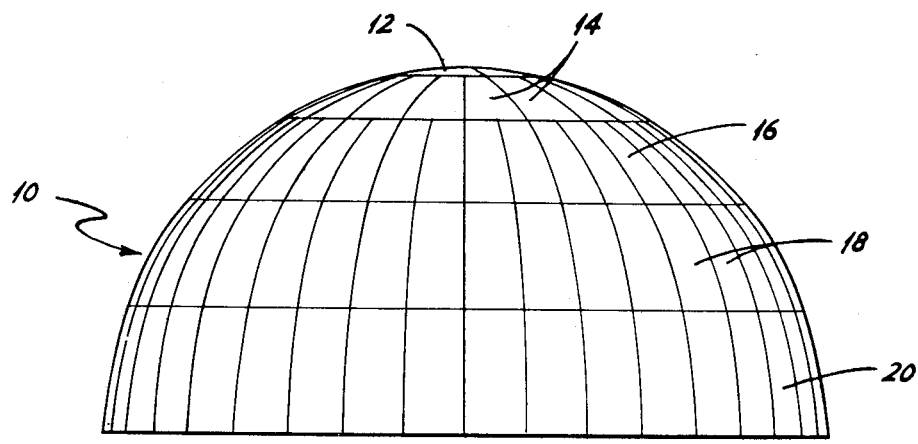
FIG. 1 is a side elevational cross-section view of a projection screen in the form of a planetarium dome which may embody the invention.
Figure 2:
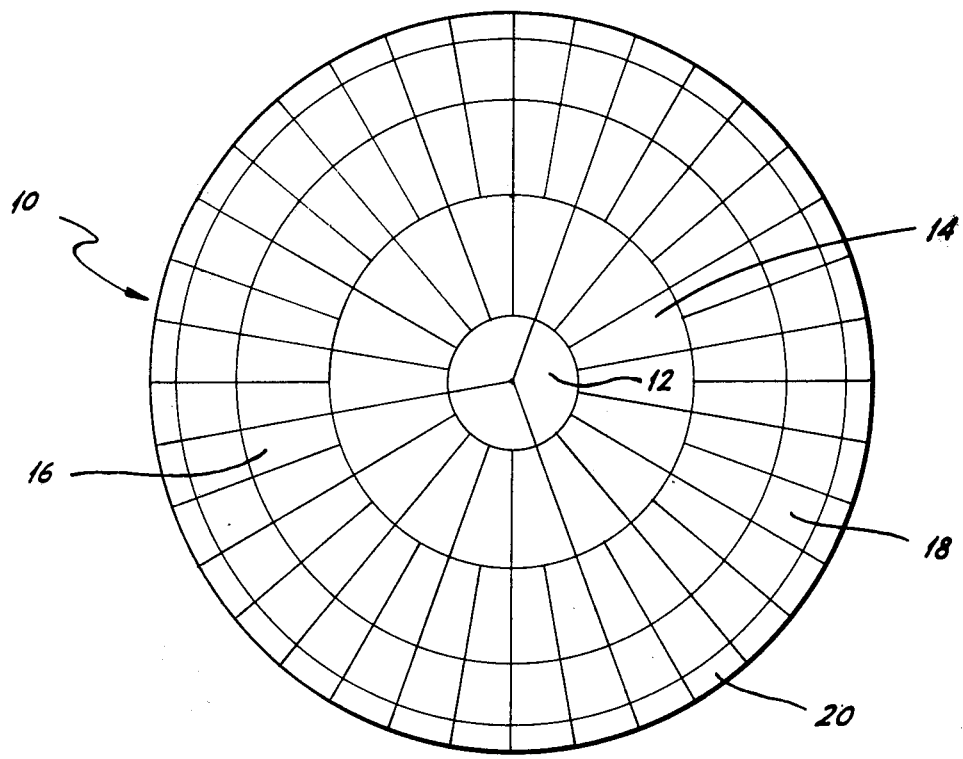
FIG. 2 is a plan view of the screen of FIG. 1 from below looking up into the dome.

As schematically indicated in FIGS. 1 and 2 the views selected are intended to convey the interior appearance of a planetarium dome screen. Such a screen is a relatively complex form of screen but one of those to which the present invention is applicable in addition to planar and curved screens of other types. The structure for supporting a screen such as shown in FIGS. 1 and 2 may be considerably varied but such structures exist in planetariums throughout the U.S. The significant thing about FIGS. 1 and 2 in connection with the present invention is that the interior surface of planetarium dome generally designated 10 forms a screen composed of a plurality of panels which must be fitted together and involve many joints or seams. At the top of the dome, for example, there may be three spherically dished segment panels 12 which fit together in a circular configuration to form the apex of the dome. Beneath these is a circular row of spherically dished, generally trapezoidal panels 14. A low circular row of panels 16 increases the number of panels employed. Beneath panels 16 lies a further circular row of panels 18, and, beneath that, still another circular row of panels 20. The dome construction illustrated is not in any sense intended to be by way of limitation. It is simply to give an impression of a typical hemispherical dome in which many panels are employed, and it will be understood that there are many variations of the forms of domes, including many different shapes of domes, some of which are not truly hemispherical in form throughout the dome, some of which are more or less of a sphere than a hemisphere, and some of which are tilted from the vertical. Of course, many other dome variations occur and are intended to be included where the invention is applicable. Whatever the form of the screen, and no matter how panels are supported, if they employ lap joints with other panels, the present invention may be employed.

Typically planetarium domes have been composed of pre-cut sheet metal perforated to a particular pattern of holes of a standarized size, shaped over a form, which may be used for other panels of the same shape and size, such as, for example, panels in a common circular row in the dome of FIGS. 1 and 2. The interior of such panels in a typical modern dome installation are prefinished usually using a white, or some other light, highly reflective colored coating which has a suitable texture for a projection screen. In recent years instead of paints coatings of materials such as polyvinyl chloride have been laminated onto the base metal which has typically been aluminum. While such laminating when done in manufacturing panel material makes the invention particularly significant, the invention may also be applied to panels which are painted or otherwise finished with a suitable coating after panel fabrication.

FIGS. 3A and 3B are diagrammatic views to show what happens in a typical prior art dome lap joint employing panels 22a and 22b, only the overlapped edges of which are shown. Where light impinges the joint perpendicularly to the joint, there is a minimum problem with the edge of the overlapping panel 22a being noticeable. However, if the light comes from another direction, shadows or highlights increase the prominence of the joint. FIG. 3A shows how shadows can occur if light comes from the direction shown relative to the overlapped panels. FIG. 3B shows the same joint of the two panels 22a and 22b with light coming from the other direction so that there is no shadow but a direct reflection from the stepped edge becomes highly noticeable because of the discontinuity in light reflectance properties, even assuming similar finishing of all parts of the stepped joint which may not be possible.

FIG. 4 shows conventional butt joint panels 24 and 26 have integral flanges 24a and 26d which are perpendicular to the joint turned away from the screen surface and fastened together in order to hold the panels in place.

Typically, light not perpendicularly incident to such a joint produces a shadow as shown.

FIG. 5 shows one solution as proposed by U.S. Pat. no. 3,594,964 wherein a T-shaped member 28 is inserted between the flanges 24a' and 26a', as shown, with the tang 28a of the T fitting between the flanges. Perforated cross web 28b of the T covers the joint and extends to the panels surfaces 24', and 26'. However, it will be noted that even if cross piece 28b is made relatively thinner, it still must have some thickness in order to be reasonably handled. In any event it is a very awkward type of construction to employ. As a consequence, in some structures of this type, the tang 28a was omitted and a perforated metal strip simply applied over the joint.

An improvement over the arrangement of FIG. 5 for reasons enumerated, was the printed polyvinyl chloride strip of the color of the panel finish, which bore black or gray dots in a distribution, size and color intensity to simulate the effect of holes in the panels which the strip was intended to cover. Such a strip, particularly with a precoating of adhesive, was more easily applied. It also was subject to becoming detached from some places along the joint. Such a joint is seen in FIG. 6 wherein tape 30 overlaps a plain flat butt joint between panels 32 and 34.

FIG. 7 shows a solution to the problem of lap joints presenting a white stripe because the white of the paint of the lower panel shows through the perforations of the overlapping panel. As shown in FIG. 7, a black strip 36 is inserted between the lower panel 38 and the upper overlapping panel 40 so that white from the panel 38 is no longer visible through holes in panel 38.

FIG. 8 illustrates how in the prior art the upper surface of the screen panel was chamfered at the edge to present less of a stepped discontinuity. The joint shown is similar to that of FIG. 7 and bears similar number designators with the addition of primes thereto. However, in chamfering panel 36' to form the chamfered surface 36a the precoated finish was cut away. Particularly if the prefinish were vinyl the repainting could not match, but even matching other paints for reflectivity as well as color has been a serious problem not to mention the tedious job of repainting.

FIG. 9 shows the construction of the present invention in which a lower panel 42 is covered by a lap joint, generally designated 44 by an upper panel 46 having an edge portion 46a that is tapered from the generally uniform thickness of the panel to a substantially thinner cross section at the terminus or free edge. The width of the tapered portion 46a along the edge of the panel is small compared to the full width of the panel. The prefinished surface is continuous and uniform and extends over the entire panel including the tapered edge portion. If desired, a black strip 45 may be provided between the over-lapping edge portions of panels 42 and 46 as shown. The panels, such as panel 46, are preferably fabricated from a material that easily is set, upon deformation beyond its elastic limit, such as a soft aluminum. The thickness of a panel, such as 46, is in the range of 0.030–0.040 inches and the vinyl covering 48 is about 6–10 mils. The feathered edge of panel 46 at the terminus or free edge is reduced to about no more than 0.010 inches by the chamfering.

FIGS. 10A, 10B, 10C and 10D show the steps of a preferred method of preparing the lap joint 44 by chamfering the edge portion 46a of panel 46. As seen in FIG. 10 the panel 46 is precoated with a layer of white or other reflective material 48, which may be a laminate of polyvinyl chloride. As seen in FIG. 10B the edge of the panel has been chamfered or cut away on a bevel along the entire edge, as may be achieved through use of a milling machine or the like. The portion cut away is on the back side, or face opposite that which has been prefinished so that the prefinished surface is not damaged. Thereafter, as shown in FIG. 10C the tapered, or chamfered, edge portion is deformed, as shown diagrammatically by the arrow, by pressing it away from the prefinished surface into a fixed surface conforming in shape to the abutting surface of the lower panel 42 of the intended joint. The edge is deformed or bent to fair into and lay against the surface of panel 42 with which it forms the joint as shown in FIG. 10D.

FIGS. 11A, 12A, 13A and 14A show different forms of chamfering by way of illustrating the variety of which may be employed within the scope of the invention. The types of chamfering shown include: a relatively steep straight line bevel 46b shown in FIG. 11A; a bevel with a rounded curve distal from the terminus and feathering toward the terminus to give a generally parabolic effect as shown at 46c in FIG. 12A; an elongated, relatively shallow slope bevel such as at 46d in FIG. 13A; and a reverse curve, or lazy S, bevel that feathers to the terminus, such as shown at 46e in FIG. 14A.

FIGS. 11B, 12B, 13B and 14B show the corresponding pieces after each has been deformed into its final shape. The shapes which the finished edge will assume after deformation will be apparent to those skilled in the art. Deformation occurs only in response to pressure applied in the direction shown schematically by the arrows in the respective figures. The manner in which the pressure is applied, as well as the form of the chamfered undercut, will determine the shape of the finished piece. Whether or not a void is left on the underside of the edge is not as important as the shape of the portion on the bottom adjacent to the substantially thinned termination of the edge. The edge desirably should appear to fair into, or merge with, the surface of the adjacent panel but this need not be a difficult requirement since panel forms have been shaped in the past so that overlapping panels will fit very well against the panel which they overlap and appear to fair to the surface throughout its length without causing gaps. The purpose of the deformation of the chamfered edge portion is to restore this condition to the thinned panel edge so that there will not be visible gaps between the edge and the panel which it overlaps. Thus, the deformation must be against a mold or form which effectively conforms the bottom of the panel generally as indicated. The deforming pressure may be applied by pressing the edge against such a form in one operation as in a press or it may be formed by rolling the edge, for example, by a rubber or other deformable roller which will form it into the desired shape.

The present invention has been described in terms of techniques and materials used in the past. There is no intention to limit the present invention to such techniques and materials and the invention is intended to be applicable using any techniques and materials with which it can be employed within the scope of the appended claims. The claims should, of course, be given the broadest interpretation to which they are properly susceptible in light of prior art.

I claim:

1. In a projection screen that includes a plurality of curved interior reflective surfaces arranged to provide at least one generally circularly arranged row of reflective surfaces and whereby each pair of adjacent surfaces is constructed and arranged to provide minimal effect upon reflection of projected light from the region of adjacency of the pair of surfaces, the improvement in construction comprising, in combination:

at least one of each adjacent pair of the plurality of curved surfaces being provided as part of a prefinished panel that is of a size and shape to have an edge portion thereof overlap an edge portion of the adjacent curved reflective surface;

said prefinished panel including a substrate sheet of metal that is originally of uniform thickness and is deformable and easily set upon deformation beyond the metal's elastic limit, and a continuous uniform reflective finish provided on the concave side of the substrate metal sheet prior to deformation of the metal sheet;

a portion of the panel adjacent the edge thereof that overlaps the adjacent curved reflective surface being shaped and arranged and deformed, without destroying the continuous character of the uniform reflective finish on the metal substrate, to have the face of reflective finish at the edge terminus of the panel terminate adjacent the said adjacent reflective surface, with the thickness of the substrate sheet of metal adjacent said edge terminus being lessened, resulting in providing a back surface, opposite the reflective surface, that will lie adjacent the adjacent curved reflective surface, to cause the reflective finish at the edge terminus of the panel to be located closely adjacent the overlapped curved reflective surface, thereby minimizing any discontinuity between the reflective finish on the panel and the overlapped reflective surface.

2. A projection screen as in claim 1 wherein the screen has the shape of a hollow dome suitable for a planetarium.

3. A projection screen as in claim 2 wherein the screen includes a plurality of circularly arranged rows of reflective surfaces that are spherically dished.

4. A projection screen as in claim 2 including a support frame conforming to the shape of the dome.